Patented June 8, 1948

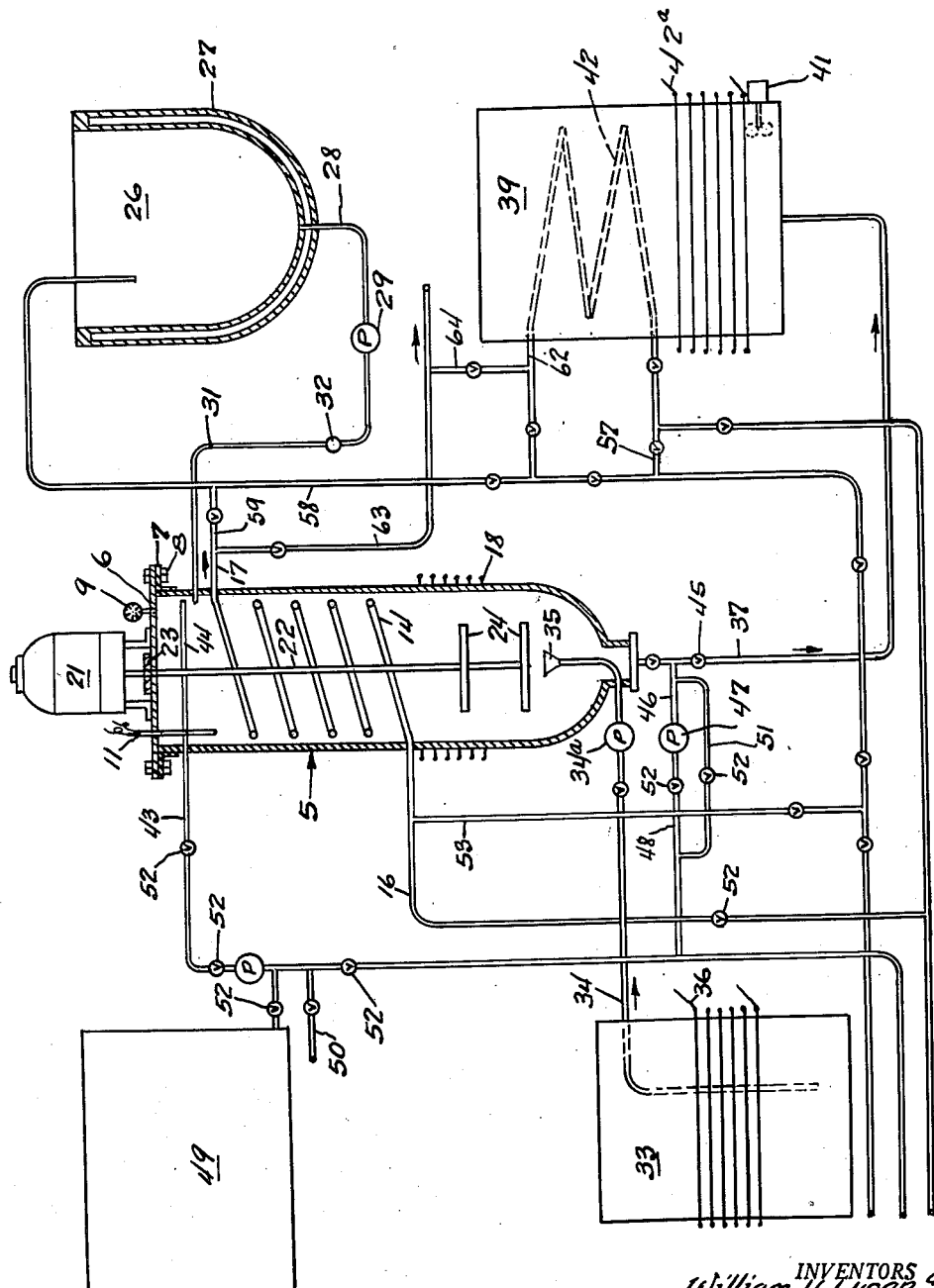

2,443,044

UNITED STATES PATENT OFFICE 2,443,044

COPOLYMERIZATION PROCESS

William H. Lycan and Howard L. Gerhart, Milwaukee, Wis., assignors to Pittsburgh Plate Glass Company, a corporation of Pennsylvania Application October 12, 1945, Serial No. 621,972

9 Claims. (Cl. 260—407)

The present invention relates to method of conjointly polymerizing unsaturated glyceride oils and unsaturated hydrocarbons and it has particular relation to the conjoint polymerization of unsaturated oils, such as linseed oil or soya bean oil, with cyclic diene hydrocarbon, such as cyclopentadiene, or a lower polymer thereof, such as the dimer, trimer, tetramer, or pentamer.

One object of the invention is to provide a proces of copolymerizing oils and hydrocarbons of the foregoing class in which a product of improved color and of high freedom from "seeds" and other objectionable components is obtained.

A second object of the invention is to provide a process of the foregoing type in which the time cycle of the oil in the reaction chamber is reduced to a minimum.

A third object is to provide a process of the foregoing type in which the total time expended in heating and copolymerizing the oil and hydrocarbon is substantially reduced over that involved in conventional practice.

A fourth object of the invention is to provide a process of copolymerizing unsaturated glyceride oils and cyclopentadiene or lower polymers of cyclopentadiene in which the temperature of the reaction mixture can be controlled with a high degree of accuracy.

These and other objects of the invention will be apparent from consideration of the following specification and the appended claims.

The single figure of the drawing illustrates diagrammatically a convenient scheme or arrangement of apparatus suitable for use in the practice of the invention.

It has heretofore been proposed to prepare copolymers of a diene hydrocarbon such as cyclopentadiene or the dimer, trimer, tetramer or pentamer of cyclopentadiene and an unsaturated glyceride oil, such as linseed oil or soya bean oil. By application of such process, copolymers were obtained having a very high rate of drying and which were eminently suited for coating purposes either with or without the incorporation of additional coating material such as oil soluble resins, oils, pigments, and the like. Heretofore, the copolymerization of the oil and the hydrocarbon was effected by charging the complete mixture into a suitable closed container, such as an autoclave, and then heating the mixture to reaction temperature and maintaining the temperature until substantially all of the hydrocarbon had combined with the oil and a copolymer of desired viscosity was obtained. The method was comparatively simple and the products were satisfactory for most uses. However, the product was colored in varying degree, and sometimes "seeds" apparently comprising higher polymers of cyclopentadiene of a relatively insoluble nature were to be found in the finished product. These seeds could be removed by filtration or centrifugation, but the operation involved an additional expense and, moreover, was attended by loss of valuable material.

The present invention is based upon the discovery, firstly, that coloration can be substantially reduced and the formation of "seed" in the copolymer product substantially avoided by reacting the hydrocarbon and the glyceride oil together under such conditions that they are at a temperature approximately within the range of 500 to 580° F. substantially throughout the period of reaction. Secondly, the invention involves the provision of a method of reacting the glyceride oil and the hydrocarbon in which the oil in a substantial amount is brought to optimum reaction temperature and the hydrocarbon is then added gradually thereto under such conditions that the optimum reaction temperature is maintained at all times.

In the embodiment of apparatus illustrated in the accompanying drawing, it is to be understood that like numerals refer to like parts throughout. The apparatus as shown comprises as its main element a reaction chamber, such as an autoclave 5 of appropriate material, such as steel, designed to withstand substantial pressure. The autoclave may conveniently be provided with a removable top or cover 6 secured upon a flange 7 at the top of the autoclave by means of bolts 8 or other convenient securing devices. The cover is provided with a pressure gage 9 and a thermocouple or other temperature measuring device 11.

The temperature of the autoclave may be controlled by appropriate means, such as a cooling coil 14, connected at one end to inlet 16 and at the opposite end to outlet 17, and being designed for the circulation of heating or cooling fluid as may be required. The fluid is admitted through a conduit 16 and withdrawn through a conduit 17. The autoclave—at least the lower portion thereof—may be heated by appropriate means, such as an electrical coil 18. The autoclave is also provided with a conventional agitator mechanism involving, for example, an appropriate motor mechanism 21 upon the head 6 driving a shaft 22 extending through an appropriate packing gland 23 in the head and being provided with convenient agitator devices, such as arms or discs 24 in any suitable number. A single disc or arm is usually sufficient, but a plurality may be employed if so desired in order to obtain more thorough dispersion of the contents of the autoclave.

Oil may be heated to the desired temperature range directly in the autoclave by coil 18, but it is found to be more economical to heat it before it is introduced into the autoclave in a container such as a varnish kettle 26 to which heat can be supplied by flame, electrically or by a heated medium such as diphenylene oxide, mercury, or the like circulating through a jacket 27. Heated oil from the kettle 26 is discharged through outlet 28 and is forced by pump 29 through line 31 to the autoclave. After the autoclave is charged with an appropriate amount of oil, the line 31 may be closed by operating a valve 32.

Cyclopentadiene, or preferably a lower polymer thereof such as dicyclopentadiene, is fed to the autoclave either continuously or intermittently at frequent intervals from a tank or container 33 through a line 34 provided with an outlet, such as a distributor head 35, preferably in the lower part of the autoclave just below the lower extremity of the agitator shaft 22. The dicyclopentadiene or other lower polymers of cyclopentadiene may be preheated by a coil 36 about the container.

The copolymer mixture from the autoclave may conveniently be discharged through a line 37 to a container 39 which may also be equipped with an agitator 41, a cooling coil 42 and optionally with a resistance coil 42a for heating the contents. All, or a portion of the cooling required to bring the copolymer product from reaction temperature to a temperature at which copolymerization ceases may be effected in the autoclave by circulation of cooling fluid in coil 14 or it can also be effected while the product is in the container 39 by circulation of fluid through the coil 42.

It is to be understood that the products of copolymerization of unsaturated oils and cyclopentadiene or its lower ploymers are soluble in paraffinic hydrocarbons such as petroleum naphtha, and that the reaction mixture may be diluted with such solvent or that the reaction product while in the autoclave or after it is removed can be diluted to substantially any desired degree, for example, in equal part with the hydrocarbon. The hydrocarbon can be employed to dilute the charge in the autoclave and to wash out residual product from the walls and appurtenances of the latter. To this end, the autoclave is provided with an inlet conduit 43, preferably near the top thereof having a spray head 44 within the autoclave. In the operation of the apparatus, the charge admixed with naphtha introduced through conduit 43 and spray head 44 may be run into the container 39. At any convenient stage in the washing operation when enough naphtha is in a given batch, a valve 45 in lower extremity of the discharge conduit 37 may be closed and the naphtha containing more or less soluble copolymer product discharged through line 46, pump 47, and line 48 to a container 49 for use in diluting the product of the next batch. Fresh naphtha can be added to the system from line 50 as needed. A line 51 bypasses pump 47 so that by operation of valves 52 in each of the lines 43, 46, 50, 58 and 51 at the points shown in the drawing fresh naptha or naphtha used in previous washing operations can be discharged into container 39 or into autoclave 5.

For purposes of conserving heat in preheating the glyceride oil employed in the practice of the invention, either of the cooling devices including coils 14 and 42 may employ the unsaturated glyceride oil used in charging the autoclave as a cooling medium, thus taking a considerable amount of the heat required in the preheating operation as waste heat from cooling the reaction mixture and/or the product. For this purpose the inlet conduit 16 of coil 14 may be connected by line 53 to a source of oil (not shown). A similar feed for coil 42 is provided by a line 57. Feedline 58 connected by cross-lines 59 and 62, respectively, to the coils 14 and 42 carries the partially heated oil to the heating kettle 26 for further heating. Branches 63 and 64 are connected to the cross-lines 59 and 62 so that the cooling medium can be otherwise disposed of in event that it is not desired to employ the glyceride oil as a cooling medium. If preferred, the various cooling devices can be connected in series, i. e. end to end so that cooling medium will enter at the coolest point in the system and will discharge into hotter zones as it heats up.

In a typical example of a run in accordance with the provisions of the present invention 492 parts by weight of soya bean oil having an iodine value of 140 was heated to 575° and while it was at that temperature in the autoclave, and was under continuous agitation dicyclopentadiene was pumped into the oil charge as a constant feed until 308 parts by weight had been added. The following is a log of the time, temperatures, and pressures during the addition:

| Time | Liquid Temperature | Gage Pressure |
|---|---|---|
| Hours | °F. | P.s.i. |
| 0:00 | 575 | |
| 0:15 | 560 | 43 |
| 0:45 | 532 | 56 |
| 1:05 | 526 | 60 |
| 1:20 | 526 | 64 |

At the completion of the addition of the dicyclopentadiene, the reaction was maintained still under agitation in accordance with the following schedule:

| Time (Continued) | Temperature | Gage Pressure | Gardner-Holdt Viscosity 50% solution in V. M. & P. Naphtha |
|---|---|---|---|
| | °F. | | |
| 1:45 | 528 | 50 | A− |
| 2:00 | 525 | 45 | |
| 2:15 | 520 | 40 | A− |
| 2:45 | 505 | 32 | B− |
| 3:10 | 506 | 27 | C |
| 3:30 | 505 | 25 | D |
| 3:45 | 500 | 20 | E |
| 4:15 | 505 | | G− |
| 4:30 | 505 | | G |

At the conclusion of the operation, the entire batch was cooled to 450° F. in order to arrest further increase in viscosity. The product was admixed with 80 parts by weight of high boiling petroleum naphtha. The product was also soluble in drying oils, turpentine, and the like. It may be admixed with pigments, such as basic lead carbonate, titanium dioxide, lithopone and others in order to obtain a coating composition eminently suitable for coating metal, iron, stone, wood, brick and other surfaces.

In a second run, a raffinate of linseed oil obtained by selective fractionation of linseed oil with furfural was employed as the oil component. In this run, 2236 lbs. of raffinate linseed oil having an iodine value of 140 was heated to 575°. The dicyclopentadiene constituting the hydrocarbon component was charged into the hot oil in accordance with the time schedule and under the conditions listed in the following log:

| Time | Temperature | Gage Pressure | Total Gallons Pumped in |
|---|---|---|---|
| Minutes | ° F. | | |
| 00 | 575 | 0 | 0 |
| 5 | 580 | 25 | 8¼ |
| 10 | 580 | 43 | 15½ |
| 15 | 565 | 73 | 37½ |
| 20 | 562 | 83 | 56½ |
| 25 | 553 | 83 | 73 |
| 30 | 553 | 75 | 80 |
| 35 | 552 | 80 | 90½ |
| 40 | 552 | 81 | 99 |
| 45 | 548 | 88 | 113 |
| 50 | 545 | 86 | 125½ |
| 55 | 542 | 87 | 136½ |
| 60 | 539 | 85 | 147 |
| 65 | 535 | 86 | 157 |
| 70 | 535 | 85 | 162.5 |

A total of 1399 lbs. of dicyclopentadiene concentrate was thus added to the hot oil. The mixture was held at 540° F. for 100 minutes until the viscosity of a sample in 50 per cent concentration in naphtha was A according to the Garnder-Holdt scale. The reaction mixture was cooled to 500 to 510° F. and held at that temperature for 35 minutes until the viscosity had risen to G. The entire contents of the autoclave was cooled to 450° F. and added with agitation to an equal weight of petroleum naphtha. The resin solution was of light color, contained but little sedimentary material, could be filtered rapidly, could be mixed with manganese, lead or cobalt driers of conventional type to provide coating compositions which dried in a manner suggesting a phenolic-wood oil varnish.

It is to be observed that the iodine value of the oil employed in this run was quite low and the drying rate of the oil was likewise low. By the copolymerization of the oil with dicyclopentadiene, it was thus possible greatly to enhance the drying capacity of low iodine value oil.

It is to be understood that substantially any of the unsaturated glyceride oils can be employed as the oil component of the copolymers herein disclosed. Linseed oil, soya bean oil, fractionated or unfractionated, are the most common ones employed in coating compositions. However, fish oils such as sardine oil, menhaden oil and whale oil, sunflower oil, tung oil, and others of like nature can also be employed in the process. The oil may be raw or bodied as may be desired.

The ratio of oil to hydrocarbon is variable over a broad range so that the product can be "tailored" to meet a wide range of conditions. The products containing a high ratio of oil to hydrocarbon are more fluid and more like the natural oils. These products can be employed as varnish oils either with or without the addition of soluble gums and resins. The products containing a high ratio of hydrocarbon, on the other hand, tend to be resin-like solids which can be dissolved in hydrocarbons such as naphtha, or in additional oil to provide coating compositions which dry readily to hard and durable films. A composition containing approximately one part by weight of hydrocarbon to two parts of oil probably represents a good average though this ratio is susceptible of great variation. Products containing more than 70 parts by weight of hydrocarbon to 30 parts of oil are resinous solids and those containing the 90 parts of oil to 10 parts of hydrocarbon are liquid. A good over-all range of oil and hydrocarbon would see to be 20 to 90 parts of oil to 80 down to 10 parts of hydrocarbon.

The polymerization of the oil and cyclopentadiene or cyclopentadiene polymer can be effected in the presence of additional resins and gums such as rosin, coumar and others. Likewise, it is admissible to add to or to replace a part of the cyclopentadiene or polymer thereof with other unsaturated hydrocarbons such as allyl esters, styrene, turpentine, hydrocarbon such as dipentene, pinene, limonene, or with open chain diene hydrocarbons such as butadiene or isoprene. The ratio of the cyclopentadiene or polymer thereof to additional polymerizable component may vary within a range approximately of 1 to 1 down to 10% or less of the additional component. These additional components are readily introduced by including them in the feed in the container 33.

The apparatus disclosed will usually be operated under the pressure of the reactants. This pressure may be due either to vaporization of the hydrocarbon components or to the cracking of the cyclopentadiene polymers to form cyclopentadiene. As the reaction progresses the hydrocarbon combines with the oil and the pressure gradually falls off as is evident from the logs of the runs above given. Usually the reaction will continue until the pressure has dropped substantially to zero and in some instances it is desirable to continue it somewhat further in order to increase the viscosity of reaction products to the desired value. It may also be stopped while the pressure is within a range of 5 to 10 lbs. per square inch. The reactants can also be introduced under any desired degree of extraneously applied pressure. The only practical upper limit would be that imposed by the strength of the apparatus and the economics of operation.

The rate of adding the hydrocarbon to the oil is susceptible of wide variation. It may be very slow so that but little if any cooling of the autoclave is required and the cyclopentadiene, dicyclopentadiene or other lower polymer is taken up by the oil almost as fast as it is introduced. There will then be only relatively slight if any reaction pressure generated in the autoclave. However, for purposes of economy, it is usually desirable to add it as rapidly as consistent with the capacity of the oil to take up the hydrocarbon without unduly increasing the pressure in the autoclave and with maintaining the temperature in the reaction zone within the desired range. The reaction is exothermic and if an excessive amount of cyclopentadiene or its polymer is present in the reaction zone at any one time, the temperature tends to rise. The temperature can be reduced to optimum level by controlling the addition of the hydrocarbon. So much hydrocarbon might be introduced within a short space that it would not be immediately reacted and it would tend at least temporarily to reduce the temperature of the reaction zone. The temperature can also be controlled to obtain optimum conditions by the circulation of cooling fluid through the coil 14 or by application of heat through the heating coil 18.

The temperature of the reaction should never be permitted to go so high as to cause undue discoloration or degeneration of the charge. If it is allowed to drop too low, polymerization of the hydrocarbon to form seedy particles in the mass may occur. About 500 to 580 or 600° F. is about the optimum range. It is to be understood that catalysts of polymerization are not required and in general they should be omitted since they require neutralization and are otherwise objectionable in the product.

The oils, as previously indicated, employed may be the natural unbodied oils. However, bodied oils may also be employed if so desired. For example, it is permissible partially or completely to body the oil in a pre-heating kettle and then while it is at or near the bodying temperature, to run it into the autoclave 5 for copolymerization with cyclopentadiene or the lower polymers thereof in accordance with the provisions of the present invention, thus reducing the total number of heating operations required. By heating the oil in the preheating kettle, considerable autoclave time can be saved.

A charge after it has reached the desired degree of polymerization and bodying in the autoclave may be discharged immediately to the storage container 39 or it may be permitted to remain in the autoclave while cooling medium is circulated through coil 14 and the agitator 24 is operated to circulate and cool charge before it is dropped. Final cooling may then be accomplished in the container 39. The autoclave may be flushed out or washed preparatory to the introduction of the next charge by means of naphtha introduced through the conduit 43. This naphtha or such part as may be desired may flow into the container 39 to admix with the product or portion thereof which contains but little dissolved copolymer may be run into container 49 for addition to the next batch.

The forms of the invention herein described are to be considered merely exemplary and it will be apparent to those skilled in the art that numerous modifications may be made therein without departure from the invention or the scope of the appended claims.

We claim:

1. A method of preparing an addendum copolymer of an unsaturated glyceride oil and a hydrocarbon of a class consisting of cyclopentadiene and the lower polymers thereof up to the pentamer, which method comprises admixing said oil and said hydrocarbon in a closed system at a temperature within a range of about 450 to 600° F. and reacting the mixture while it is at said temperature until the pressure of the reaction mixture drops substantially to zero and a product soluble in petroleum naphtha is formed.

2. A process of forming a copolymer of an unsaturated glyceride oil and a hydrocarbon of a class consisting of cyclopentadiene and lower polymers thereof up to the pentamer, which process comprises reacting a mixture thereof containing 20 to 90 parts of oil and 10 to 80 parts of said hydrocarbon and in a closed system at a temperature within a range of 450 to 600° F. substantially without passing through an intermediate temperature range until a naphtha soluble copolymer is formed and substantially all of the hydrocarbon is combined with the oil.

3. A process of forming a copolymer of unsaturated glyceride oil and a hydrocarbon of a class consisting of cyclopentadiene and lower polymers thereof up to the pentamer, which process comprises heating the oil to a temperature approximately within the range of 450 to 600° F., then running the hydrocarbon into the mixture while maintaining the mixture within the foregoing temperature range and maintaining the temperature of the mixture until substantially all of the hydrocarbon has combined with the glyceride oil to form a naphtha soluble polymer.

4. A process of forming a copolymer of unsaturated glyceride oil and a hydrocarbon of a class consisting of cyclopentadiene and the lower polymers thereof up to the pentamer, which process comprises running the hydrocarbon into a charge of the oil in a closed system until 10 to 80 parts of the hydrocarbon for each 20 to 90 parts of oil have been added, the oil being at a temperature of about 450 to 600 °F. and maintaining the mixture within said range during the addition of the hydrocarbon and for a period thereafter sufficient to affect a combination of substantially all of the hydrocarbon with the oil until the pressure has dropped below 10 lbs. per square inch, then cooling the mixture.

5. A process as defined in claim 1 in which the oil is linseed oil.

6. A process as defined in claim 2 in which the oil is soya bean oil.

7. A method of preparing an addendum copolymer of an unsaturated glyceride oil and a hydrocarbon of the class consisting of cyclopentadiene and the lower polymers thereof up to the pentamer, which method comprises admixing said oil and said hydrocarbon in a closed system at a temperature within a range of about 450 to 600° F. and reacting the mixture while it is at said temperature until the pressure of the reaction mixture drops to a value substantially within the range of 10 to 5 pounds per square inch.

8. A method of preparing a copolymer of an unsaturated glyceride oil and a hydrocarbon of the class consisting of cyclopentadiene and the lower polymers thereof up to the pentamer, which method comprises admixing said oil and said hydrocarbon by adding the hydrocarbon to the oil while the oil is heated to a temperature of 450 to 600° F. and at such rate that the temperature is maintained within said range throughout the addition, addition being continued until 10 to 80 parts of hydrocarbon have been added for each 20 to 90 parts of oil, the temperature being maintained until the reaction temperature drops to a value substantially within the range of 10 to 5 lbs. per square inch.

9. A method of preparing an addendum copolymer of an unsaturated glyceride oil and a hydrocarbon of the class consisting of cyclopentadiene and the lower polymers thereof up to the pentamer, which method comprises adding said hydrocarbon to the oil in a closed system; the oil being heated to a temperature within a range of 450 to 600° F., the temperature being maintained during the addition, the addition being continued until 10 to 80 parts of hydrocarbon have been added per 20 to 90 parts of the oil, the temperature then being maintained until the pressure of reaction drops to a value within a range of 10 to 5 lbs. per square inch.

WILLIAM H. LYCAN.
HOWARD L. GERHART.

REFERENCES CITED

The following references are of record in the file of this patent:

UNITED STATES PATENTS

| Number | Name | Date |
|---|---|---|
| 2,387,895 | Gerhart | Oct. 30, 1945 |